UNITED STATES PATENT OFFICE.

JOHN F. ALEXANDER, OF WASHINGTON, DISTRICT OF COLUMBIA.

EXPLOSIVE.

SPECIFICATION forming part of Letters Patent No. 488,534, dated December 27, 1892.

Application filed March 20, 1890. Renewed March 11, 1891. Again renewed March 19, 1892. Serial No. 425,624. (No specimens.)

*To all whom it may concern:*

Be it known that I, JOHN F. ALEXANDER, a citizen of the United States, residing at Washington, in the District of Columbia, have invented certain new and useful Improvements in Explosives; and I do hereby declare the following to be a full, clear, and exact description of the invention, such as will enable others skilled in the art to which it appertains to make and use the same.

My invention relates to improvements in explosives of the class known as smokeless powders, whereby I am enabled to produce from well known materials, new compounds possessing in a great degree all desirable qualities for use in fire arms, and which are to a great extent free from the objectionable features inherent in black powder.

One object of my invention is to make a powder, uniform and reliable in composition, and in combustion; safe to manufacture and to use; practically smokeless, and of great relative power as compared with its volume, so that a short cartridge-case may be used, which is of especial advantage in magazine and machine guns as well as for all military purposes.

A further object of my improvement is the production of a powder, in which the report is greatly lessened in volume and intensity as compared with the report made by a charge of other powder giving equal force.

A further object of my invention, is the production of a powder, in which all the grades thereof are composed of the same ingredients, combined by the same processes, and in the same proportions except as to one of said ingredients, the proportions of which are varied to give different qualities to the product, all as will be fully described hereinafter. To these ends, I take of pulverized naphthaline, or other suitable solid hydrocarbon, one half part, of sulphur, one part, mix and dissolve them in boiling alcohol, or other solvent, such as ether, benzine or the like and to this compound I add eight parts of chlorate, perchlorate, or nitrate of potassium, or of nitrate of sodium, two parts of sulphate of ammonium and one part more or less of picrate of ammonium, and to make a comparatively noiseless powder I add to this one part of desiccated ammonia alum, and boil until the mixture is thoroughly incorporated, the chemical reactions completed, and the excess of solvent evaporated, which is shown by the mass assuming a light gamboge color; I then granulate or pour into molds to cool and harden.

Preferably I employ for powders for fire arms the nitrate of potassium, and one or more parts of picrate of ammonium, in combination with the naphthaline, and add one part of powdered ammonia alum. I obtain by this combination, a very uniform and stable powder, slow and even in combustion, making very little smoke, and free from noxious fumes, and making, when fired, a surprisingly low report, as compared with the great force, and high velocity imparted to the projectile. Omitting the alum, the same composition is much more quick in explosion; the report loud and sharp, and the strength volume for volume, about three times that of good black powder; the size and density of grain determines with great exactness the rapidity of explosion.

I have discovered that the alum, in combination with other powder so far as I have been able to test it, has the property of lessening the report. This property is however, much more noticeable with some powders than with others, and I am at this time wholly unable to assign the cause of this, or indeed to explain the action of this substance in lessening the report. Hence I do not limit my use of this material to combination with any special powder, or purpose to use it in all grades of my own, as in some cases a loud report is desirable, as in shells, shrapnel and the like. For these uses and for torpedoes, blasting, &c., a very quick and powerful explosion is requisite, and this quality is secured by additional or greater proportions of the picrate, and varied proportions of the nitrate and chlorate, the compound may be made extremely quick and powerful, and of great stability and permanence, and without being too sensitive for these purposes, while by employing the picrate in combination with the chlorate, unmixed with either perchlorate, or nitrate, an exceedingly violent composition results, that is readily exploded by percussion, or by friction. I am therefore enabled to produce from these materials, all useful grades of powder. I design more especially however, to combine the chlorates, perchlorates, and nitrate of potassium, and nitrate of sodium, and the picrate of ammonium, in varying proportions with the hydrocarbon mixture, so as only to produce safe and permanent compounds, ranging from the most slow and uniform in combustion, to the quickest, but to retain in all these grades the qualities of comparative freedom from smoke and smell, and great power in small volume of the powder.

I may, for powders requiring the highest force of explosion, omit the sulphate of ammonium from the composition; its uses are to reduce the rapidity of explosion, while adding to the volume of gases, and it is thus a most valuable component of powder.

I claim.

1. A powder composed of naphthaline, or suitable solid hydrocarbon, and sulphur, a potassium salt or salts, and picrate of ammonium, in variable proportions, substantially as described.

2. A powder composed of naphthaline, or suitable solid hydrocarbon, and sulphur, a potassium salt or salts, picrate of ammonium, and sulphate of ammonium, in variable proportions substantially as described.

In testimony whereof I affix my signature in presence of two witnesses.

JOHN F. ALEXANDER.

Witnesses:
H. J. GIFFORD,
WM. H. DE LACEY.